(12) United States Patent
Böhnke (10) Patent No.: US 12,275,059 B2
(45) Date of Patent: Apr. 15, 2025

(54) FOUNDRY ARTICLES FOR METAL WORKING APPLICATIONS, METHODS OF MAKING SUCH FOUNDRY ARTICLES, AND PARTICULATE REFRACTORY COMPOSITIONS FOR USE IN SUCH METHODS

(71) Applicant: IMERTECH SAS, Paris (FR)

(72) Inventor: Sandra Böhnke, Oberhausen (DE)

(73) Assignee: IMERTECH SAS, Paris (FR)

( * ) Notice: Subject to any disclaimer, the term of this patent is extended or adjusted under 35 U.S.C. 154(b) by 1338 days.

(21) Appl. No.: 15/733,252

(22) PCT Filed: Dec. 20, 2018

(86) PCT No.: PCT/EP2018/086389
§ 371 (c)(1),
(2) Date: Jun. 17, 2020

(87) PCT Pub. No.: WO2019/122237
PCT Pub. Date: Jun. 27, 2019

(65) Prior Publication Data
US 2020/0384527 A1    Dec. 10, 2020

(30) Foreign Application Priority Data

Dec. 20, 2017 (EP) .................................. 17209150

(51) Int. Cl.
*B22C 1/18* (2006.01)
*C04B 14/06* (2006.01)
(Continued)

(52) U.S. Cl.
CPC ............ *B22C 1/186* (2013.01); *C04B 14/066* (2013.01); *C04B 14/08* (2013.01); *C04B 14/106* (2013.01);
(Continued)

(58) Field of Classification Search
CPC ....... B22C 1/186; C04B 14/066; C04B 14/08; C04B 14/106; C04B 14/18; C04B 14/202;
(Continued)

(56) References Cited

U.S. PATENT DOCUMENTS

| 552,202 A | 11/1985 | Bugg |
| 9,038,708 B1 | 5/2015 | Hoffman |
| 2008/0099180 A1* | 5/2008 | Weicker ................. B22C 1/188 264/432 |

FOREIGN PATENT DOCUMENTS

| EP | 0 164 188 A1 | 12/1985 |
| EP | 1 122 002 A1 | 8/2001 |
| WO | WO 02/36289 A1 | 5/2002 |

OTHER PUBLICATIONS

International Search Report issued Jan. 31, 2019, in International Application No. PCT/EP2018/086389.
(Continued)

*Primary Examiner* — Kevin P Kerns
*Assistant Examiner* — Steven S Ha
(74) *Attorney, Agent, or Firm* — RENNER, OTTO, BOISSELLE & SKLAR, LLP (57) ABSTRACT

The present invention relates to methods for forming bonded particulate refractory materials for use in metal-working, comprising the steps of providing a fine particulate metal oxide, providing an aqueous alkaline composition, providing a particulate refractory mould material, mixing the said fine particulate metal oxide, the said aqueous alkaline composition and the said particulate refractory mould material, and shooting the obtained mixture in a core shooter. Substantially all the water included in the obtained mixture is derived from the aqueous alkaline solution and optionally the surfactant. Also part of the present invention are mate-
(Continued)

rials and articles obtained according to the method, as well as particulate compositions for use in the method.

15 Claims, 3 Drawing Sheets (51) Int. Cl.
C04B 14/08 (2006.01)
C04B 14/10 (2006.01)
C04B 14/18 (2006.01)
C04B 14/20 (2006.01)
C04B 14/30 (2006.01)
C04B 18/08 (2006.01)
C04B 18/14 (2006.01)
C04B 28/26 (2006.01)
C04B 40/02 (2006.01)
C04B 111/00 (2006.01)

(52) U.S. Cl.
CPC ............ C04B 14/18 (2013.01); C04B 14/202 (2013.01); C04B 14/303 (2013.01); C04B 14/305 (2013.01); C04B 14/306 (2013.01); C04B 18/08 (2013.01); C04B 18/146 (2013.01); C04B 28/26 (2013.01); C04B 40/0263 (2013.01); C04B 2111/00939 (2013.01); C04B 2235/3201 (2013.01); C04B 2235/3206 (2013.01); C04B 2235/3208 (2013.01)

(58) Field of Classification Search
CPC ... C04B 14/303; C04B 14/305; C04B 14/306; C04B 18/08; C04B 18/146; C04B 28/26; C04B 40/0263; C04B 2111/00939; C04B 2235/3201; C04B 2235/3206; C04B 2235/3208
See application file for complete search history.

(56) References Cited

OTHER PUBLICATIONS

Reinicke, Andreas, "Mechinical and Hydraulic Aspects of Rock-Proppant Systems," "Laboratory Experiments and Modelling Approaches," GFZ Helmholtz-Zentrum POTSDAM, Scientific Technical Report STR11/09, den Oct. 8, 2009, p. 40.

* cited by examiner

FOUNDRY ARTICLES FOR METAL WORKING APPLICATIONS, METHODS OF MAKING SUCH FOUNDRY ARTICLES, AND PARTICULATE REFRACTORY COMPOSITIONS FOR USE IN SUCH METHODS

CLAIM FOR PRIORITY

This application is a U.S. national phase entry under 35 U.S.C. § 371 from PCT International Application No. PCT/US2018/086389, filed Dec. 20, 2018 which claims the benefit of priority of European Patent Application No. 17209150.6 filed Dec. 20, 2017, from both of which this application claims priority and both of which are incorporated herein by reference.

FIELD OF THE INVENTION

The present invention relates to improved methods for producing foundry articles, such as foundry cores and foundry moulds, for metalworking applications and the foundry articles obtained by using such methods. Also part of the present invention are refractory particulate compositions for the formation of such foundry cores, or for use in such methods.

BACKGROUND OF THE INVENTION

The formation of bonded refractory materials for foundry articles such as foundry moulds and cores is well known in the art. Traditionally, a refractory particulate material, such as for example silica sand, quartz sand or fly ash, is bonded using organic binders based on, for example, polyurethanes, phenolic resins, novolac resins, or the like.

DE 10 2004 042 535 A1 discloses refractory moulding materials comprising binders based on waterglass in the presence of particulate metal oxides such as silica, titania, alumina or zirconia. These inorganic binders have a distinct advantage in that the use of inorganic binders avoids the decomposition of the organic binder on contact of the finished foundry mould or core with molten metal, leading to emissions of harmful compounds such as benzene, xylene, toluene, phenol, formaldehyde or the like.

EP 1 122 002 A1 discloses refractory moulding materials comprising binders based on a combination of metal oxides and aqueous alkali (such as NaOH) in the presence of additional water. Any test pieces obtained had to be cured outside the core box using microwave irradiation and/or heating at 700° C. in order to achieve satisfactory results. It was also found that the cured test pieces crumbled upon contact with water.

The prior art therefore constitutes a problem.

SHORT DESCRIPTION OF THE INVENTION

The present invention is defined in the appended claims.

In particular, the present invention is embodied by a method for the formation of a bonded particulate refractory material for use in metalworking, comprising the steps of providing a fine particulate metal oxide, providing an aqueous alkaline composition, providing a particulate refractory mould material, and optionally providing a surfactant and/or a metal hydroxide, then mechanically mixing the provided components, and followed by shooting the obtained mixture in a core shooter. According to the present invention, substantially all the water included in the obtained mixture is derived from the aqueous alkaline solution, optionally the surfactant. In other words, 99.75 wt.-% or more of water, 99.8 wt.-% or more of water, 99.9 wt.-% or more of water, 99.95 wt.-% or more of water, 99.99 wt.-% or more of water included in the obtained mixture is derived from the aqueous alkaline solution, optionally the surfactant, based on the total weight of the mixture obtained. No additional water, or no more than 0.01 wt.-% additional water, or no more than 0.05 wt.-% additional water, or no more than 0.1 wt.-% additional water, or no more than 0.2 wt.-% additional water, or no more than 0.25 wt.-% is added to the said mixture besides the water contained in the initially provided components of the mixture, based on the total weight of the mixture obtained. In certain embodiment some moisture may also be derived from the particulate refractory mould material and/or metal hydroxide. According to the present invention, a particulate refractory mould material was bonded by using a combination of fine particulate metal oxide and aqueous alkaline composition, which may be considered a binder system for the purposes of the present invention. It was found that with the method according to the present invention, improved properties of bonded particulate materials could be obtained.

According to one embodiment, the shooting step includes curing at a temperature of no more than 300° C. for no more than 120 seconds, either using a pressurised heated air flow, or without using air flow. It was found that such curing conditions were sufficient to obtain a bonded material with satisfactory mechanical properties. It was further found that under such conditions, curing using microwave radiation, $CO_2$ flow or high temperature curing was not required.

According to one embodiment, the total moisture level in the combined fine particulate metal oxide and aqueous alkaline composition is in the range of 10 wt.-% to less than 30 wt.-%, such as from 22 wt.-% to less than 30 wt.-%, based on the total weight of particulate metal oxide and aqueous alkaline composition. It was found that when the moisture level was in that range, particularly good mechanical properties could be obtained for the bonded refractory products.

According to one embodiment, the relative amounts of the provided components were selected such that the total content of the fine particulate metal oxide and the aqueous alkaline composition in the obtained mixture of fine particulate metal oxide, aqueous alkaline composition and particulate refractory mould material is in the range of from more than 0.5 wt.-% to less than 5.0 wt.-%, such as from more than 3.8 wt.-% to less than 5.0 wt.-%, based on the total weight of the obtained mixture. It was found that within these relative weight ratios, particularly good mechanical properties could be obtained for the bonded refractory products.

According to one embodiment, the total moisture content in the provided fine particulate metal oxide aqueous alkaline composition and particulate refractory mould material is in the range of from 0.8 wt.-% to 1.6 wt.-%, based on the total weight of the components. It was found that when the moisture level was in that range, particularly good mechanical properties could be obtained for the bonded refractory products.

According to one embodiment, the weight ratio between the alkaline contained in the aqueous alkaline composition and the fine particulate metal oxide is in the range of 0.05 to 0.5, such as in the range of 0.15 to 0.3, based on the theoretical dry alkaline comprised in the said aqueous alkaline composition. It was found that within these relative weight ratios, particularly good mechanical properties could be obtained for the bonded refractory products.

According to one embodiment, the shooting includes curing at a temperature of no more than 180° C. for no more than 10 seconds in the core shooter, without using air flow. It was found that such heating without any additional means of curing was sufficient to obtain good mechanical properties could be obtained for the bonded refractory products. According to one embodiment, the shooting includes curing at a temperature of no more than 180° C. for no more than 10 seconds in the core shooter, with using air flow, in which case good mechanical properties for the bonded refractory products could also be obtained.

According to one alternative embodiment, the shooting includes curing at a temperature of no more than 120° C. for no more than 20 seconds using a pressurised air flow in the core shooter. It was found that such heating under air flow, without any additional means of curing, was sufficient to obtain good mechanical properties could be obtained for the bonded refractory products. In one embodiment heating and curing was carried out and good mechanical properties could be obtained for the bonded refractory products.

According to one embodiment, the fine particulate metal oxide is selected from the group consisting of silica fume, precipitated silica, pyrogenic silica, silicates, calcined or non calcined aluminosilicates such as metakaolin or perlite, fine alumina, fine titania, fine zinc oxide, diatomaceous earth, and other metal oxides that form metalates in the presence of alkaline, and mixtures thereof. It was found that good mechanical properties could be obtained by using any of these particulate metal oxides as part of the binder system.

According to one embodiment, the aqueous alkaline composition is selected from the groups consisting of aqueous sodium hydroxide, aqueous potassium hydroxide, aqueous lithium hydroxide, aqueous calcium hydroxide solution and/or suspension, aqueous magnesium hydroxide suspension, and mixtures thereof. It was found that the binder system could be used with any of these aqueous alkaline compositions.

According to one embodiment, the particulate refractory mould material is selected from foundry sand, silica sand, reclaimed sand, such as reclaimed foundry sand and/or reclaimed core sand, intermediate or high strength ceramic proppants, bauxite, alumina, mullite, olivine sand, chromite sand, zircon sand, chamotte sand, perlite, fly ash, vermiculite and mixtures thereof. It was found that the binder system consisting of particulate metal oxide and aqueous alkaline composition could be successfully applied to any of these refractory mould materials.

According to one embodiment, a step of curing by $CO_2$ blowing or microwave irradiation is not required.

Also part of the present invention are refractory bonded particulate materials obtained according to the method of the present invention. These materials may be foundry articles, such as foundry cores, foundry moulds, or the like.

Also part of the present invention is a particulate mixture for use in the method according to the invention, comprising a fine particulate metal oxide, an aqueous alkaline composition, a particulate refractory mould material and optionally a surfactant and/or a metal hydroxide, as obtained at the end of the mixing step of the method according to the invention. The content of fine particulate metal oxide, an aqueous alkaline composition in the said mixture may be in the range of from more than 0.5 wt.-% to less than 5.0 wt.-%, such as from more than 3.8 wt.-% to less than 5.0 wt.-%, based on the total weight of the mixture. The mixture may have a moisture content in the range 0.8 wt.-% to 1.6 wt.-%, based on the total weight of the mixture. Also in the mixture, the weight ratio of the fine particulate metal oxide and the alkaline from the aqueous alkaline composition may be in the range of 0.05 to 0.5, such as in the range of 0.15 to 0.3, based on the theoretical dry alkaline comprised in the said aqueous alkaline composition.

Also part of the present invention is a binder system for use in the particulate mixture according to one aspect of the invention, or for use in the method according to the invention, comprising a fine particulate metal oxide, and an aqueous alkaline composition. The said binder system may have a total moisture content in the range of 10 wt.-% to less than 30 wt.-%, such as from 22 wt.-% to less than 30 wt.-%, based on the total weight of the binder system. Also, the weight ratio between the alkaline contained in the aqueous alkaline composition and the fine particulate metal oxide may be in the range of 0.05 to 0.5, such as in the range of 0.15 to 0.3, based on the theoretical dry alkaline comprised in the said aqueous alkaline composition.

SHORT DESCRIPTION OF THE FIGURES

The invention will be further illustrated by reference to the following figures.

Figure 1:
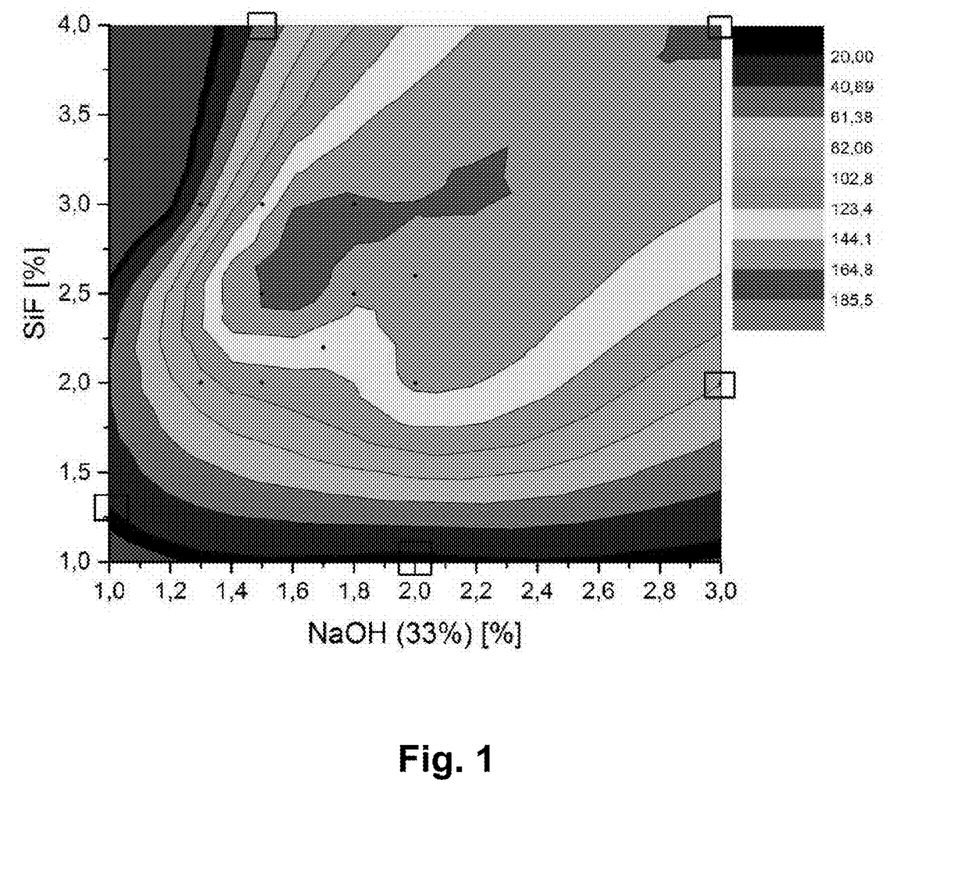
FIG. 1 is a two-dimensional representation showing warm bending strength at t=0 h, as a function of contents of fine particulate metal oxide and aqueous alkaline composition.
Figure 2:
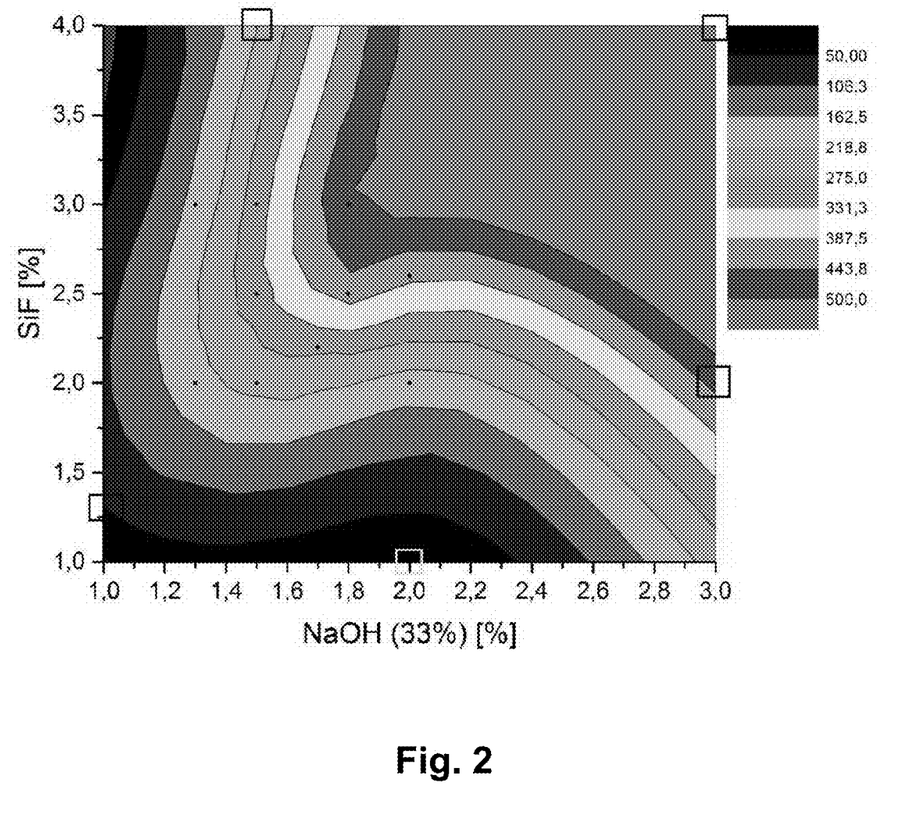
FIG. 2 is a two-dimensional representation showing cold bending strength at t=1 h, as a function of contents of fine particulate metal oxide and aqueous alkaline composition.
Figure 3:
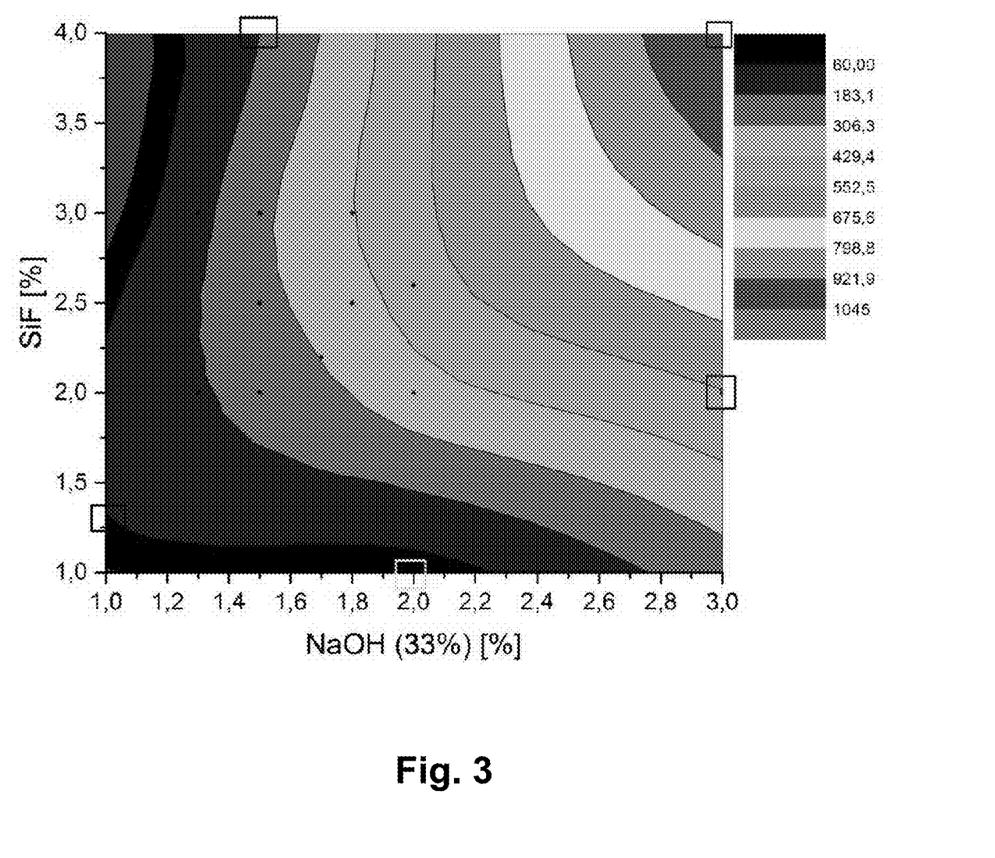
FIG. 3 is a two-dimensional representation showing bending cold strength at t=24 h, as a function of contents of fine particulate metal oxide and aqueous alkaline composition.

It is understood that the following description and references to the figures concern exemplary embodiments of the present invention and shall not be limiting the scope of the claims.

DETAILED DESCRIPTION OF THE INVENTION

The present invention according to the appended claims provides methods for obtaining bonded refractory materials for use in foundry.

According to the present invention, it was found that improved properties can be obtained in refractory bonded particulate articles, if they are formed using a refractory mould material in combination with a fine particulate metal oxide and an aqueous alkaline composition, provided that no additional water is added to the mixture besides the water contributed by the aqueous alkaline composition and optionally by the surfactant. In certain embodiments, the refractory bonded particulate articles may comprise a surfactant and/or a metal hydroxide.

In particular, a combination of fine particulate metal oxide and aqueous alkaline composition could be used to replace waterglass often employed in accordance with the prior art.

Without wanting to be bound by theory, it is thought that the mechanism of the present invention involves the low moisture level and the absence of silicates prior to the mixing. These factors may push the reaction between alkali and metal oxide to happen very rapidly in a very confined space close to the refractory mould material particles, which in turn leads to very high bonding between refractory mould material particulates without the formation of any waterglass in the solution.

In order for this mechanism to occur, it was found that it is advantageous that the relative concentrations of the components are controlled within specifically defined boundary conditions.

As used herein, the terms "fine particulate metal oxide" designate amorphous metal oxide powders having average primary particle sizes of 50 μm or less. Fine particulate metal oxides are alternatively known as metal oxide dusts, and may have a particle size distribution such that the $d_{50}$ is 50 μm or less, or 30 μm or less, or 20 μm or less, or 15 μm or less, or 10 μm or less, or 5 μm or less. Fine particulate metal oxides may be obtained as the main components from furnace dusts, obtained as a by-product in the operation of furnaces, such as for example electric arc furnaces used in the manufacture of fused metal oxides.

As used herein, the term "silica fume" (CAS number 69012-64-2), or microsilica designates an amorphous polymorph of silicon dioxide ($SiO_2$), which is a powder with an average primary particle size of about 150 nm, and more generally from 80 nm to 5 μm. Silica fume particles have a strong tendency to form agglomerates with a diameter of up to 50 μm. Silica fume has a BET surface area of greater than 15 $m^2/g$, and typically up to 30 $m^2/g$, and may be obtained as a by-product from the production of silicon, ferrosilicon or fused silica, for example.

As used herein, the term "fumed silica" (CAS number 112945-52-5), or pyrogenic silica, designates microscopic droplets of amorphous silica fused into branched chain-like particles which have a tendency to agglomerate. The primary particle size is in the range of 5 to 50 nm and the BET surface area is typically from 50 to 600 $m^2/g$. Fumed silica is produced by a rather complex pyrogenic process.

Throughout the present application, particle size distributions were measured using laser light scattering with a Malvern Mastersizer 2000. Prior to the measurement, samples were dispersed in water, and an ultrasonic treatment was applied for full de-agglomeration of the sample. As used herein, the values $d_{10}$, $d_{50}$, $d_{90}$ and $d_{99}$ when describing particle size distributions define the particle size at which 10% of particles, or 50% of particles, or 90% of particles or 99% of particles, as the case may be are smaller than the value.

According to the present invention, a method is provided wherein refractory bonded particular materials for the formation of refractory foundry articles are formed. The method according to the invention is characterised by the specific combination of refractory mould material, aqueous alkaline composition, particulate metal oxide, and optionally surfactant and/or a metal hydroxide. These components are mixed, and shot using a core shooter as known to the skilled person in the art. In accordance with the present invention, the obtained core is hardened by the use of heat only, either using a compressed air stream, or heating without air flow, or a combination of both. The methods according to the present invention do not rely on additional chemical or physical measures for curing the product, such as microwave radiation, $CO_2$ blowing or even elevated temperatures about 300° C.

The method according to the present invention is characterised by the feature that no additional water is added to the mixture besides the use of the aqueous alkaline, and optionally the use of the surfactant. This offers additional ease and simplicity in sample preparation for obtaining the mixture to be shot using a core shooter.

Shooting and Curing

According to a specific embodiment of the present invention, the shooting in the core shooter includes curing at a temperature of no more than 300° C. for no more than 120 seconds, either using a pressurised heated air flow, and/or without using air flow.

According to one embodiment, the said curing is carried out using a pressurized air flow at a temperature of 300° C., or at a temperature of 280° C., or at a temperature of 260° C., or at a temperature of 240° C., or at a temperature of 220° C., or at a temperature of 200° C., or at a temperature of 180° C., or at a temperature of 160° C., or at a temperature of 140° C., or at a temperature of 120° C. According to one embodiment, the said curing using a pressurized air flow is carried out at any of the temperatures mentioned above, for a duration of 120 seconds, or for a duration of 100 seconds, or for a duration of 90 seconds, or for a duration of 80 seconds, or for a duration of 70 seconds, or for a duration of 60 seconds, or for a duration of 50 seconds, or for a duration of 40 seconds, or for a duration of 30 seconds, or for a duration of 20 seconds, or for a duration of 10 seconds, or for a duration of 5 seconds.

According to one embodiment, the said curing is carried out without air flow at a temperature of 300° C., or at a temperature of 280° C., or at a temperature of 260° C., or at a temperature of 240° C., or at a temperature of 220° C., or at a temperature of 200° C., or at a temperature of 180° C., or at a temperature of 160° C., or at a temperature of 140° C., or at a temperature of 120° C. According to one embodiment, the said curing without air flow is carried out at any of the temperatures mentioned above, for a duration of 120 seconds, or for a duration of 100 seconds, or for a duration of 90 seconds, or for a duration of 80 seconds, or for a duration of 70 seconds, or for a duration of 60 seconds, or for a duration of 50 seconds, or for a duration of 40 seconds, or for a duration of 30 seconds, or for a duration of 20 seconds, or for a duration of 10 seconds, or for a duration of 5 seconds.

According to some embodiments of the present invention the shooting in the core shooter includes curing at a temperature of no more than 300° C. for no more than 120 seconds, wherein a combination of no air flow and subsequent pressurized air flow is used. For example, the said curing may include a heating without air flow at 160° C. for 10 seconds, followed by a pressurized air flow of 120° C. for 20 seconds.

Particulate Components for the Mixture

Moisture Level in the Binder Components

According to one embodiment of the present invention, the total moisture level in the combined fine particulate metal oxide and aqueous alkaline composition may be in the range of 10 wt.-% to less than 30 wt.-%, such as in the range of 10.0 wt.-% to less than 30.0 wt.-%, based on the total weight of particulate metal oxide and aqueous alkaline composition. According to one embodiment of the present invention, the total moisture level in the combined fine particulate metal oxide and aqueous alkaline composition may be in the range of 22 wt.-% to less than 30 wt.-%, such as in the range of 22.0 wt.-% to less than 30.0 wt.-%, based on the total weight of particulate metal oxide and aqueous alkaline composition. For example, the total moisture level in the combined fine particulate metal oxide and aqueous alkaline composition may be about 10 wt.-%, or about 12 wt.-%, or about 14 wt.-%, or about 16 wt.-%, or about 18 wt.-%, or about 20 wt.-%, or about 22 wt.-%, or about 22.0 wt.-%, or about 23 wt.-%, or about 24 wt.-%, or about 25 wt.-%, or about 26 wt.-%, or about 27 wt.-%, or about 28 wt.-%, or about 29 wt.-%, or about 30 wt.-%, or about 30.0 wt.-%. For example, the total moisture level in the combined fine particulate metal oxide and aqueous alkaline composition may be more than 10 wt.-%, but less than 30 wt.-%, or less than 30.0 wt.-%, or less than 29 wt.-%, or less than 28 wt.-%, or less than 27 wt.-%, or less than 26 wt.-%, or less than 25 wt.-%, or less than 24 wt.-%, or less than 23 wt.-%, or less than 22 wt.-%, or less than 20 wt.-%, or less than 18 wt.-%, or less than 16 wt.-%, or less than 14 wt.-%, or less than 12 wt.-%. For example, the total moisture level in the combined fine particulate metal oxide and aqueous alkaline composition may be less than 30 wt.-%, but more than 10 wt.-%, or more than 10.0 wt.-%, or more than 12 wt.-%, or more than 14 wt.-%, or more than 16 wt.-%, or more than 18 wt.-%, or more than 20 wt.-%, or more than 22 wt.-%, or more than 22.0 wt.-%, or more than 23 wt.-%, or more than 24 wt.-%, or more than 25 wt.-%, or more than 26 wt.-%, or more than 27 wt.-%, or more than 28 wt.-%, or more than 29 wt.-%.

Binder Level in the Total Mixture

According to one embodiment of the present invention, the total content of the fine particulate metal oxide and the aqueous alkaline composition in the mixture of the fine particulate metal oxide, the aqueous alkaline composition and the particulate refractory mould material obtained at the end of step (iv) is in the range of from more than 0.5 wt.-% to less than 5.0 wt.-%, such as more than 3.8 wt.-% to less than 5.0 wt.-%, such as more than 3.80 wt.-% to less than 5.00 wt.-%, based on the total weight of the obtained mixture. For example, the total content of the fine particulate metal oxide and the aqueous alkaline composition in the mixture of the fine particulate metal oxide, the aqueous alkaline composition and the particulate refractory mould material obtained at the end of step (iv) may be about 0.5 wt.-%, or about 0.50 wt.-%, or about 1.0 wt.-%, or about 1.5 wt.-%, or about 2.0 wt.-%, or about 2.5 wt.-%, or about 3.0 wt.-%, or about 3.5 wt.-%, or about 3.8 wt.-%, or about 3.80 wt.-%, or about 3.9 wt.-%, or about 4 wt.-%, or about 4.0 wt.-%, or about 4.1 wt.-%, or about 4.2 wt.-%, or about 4.3 wt.-%, or about 4.4 wt.-%, or about 4.5 wt.-%, or about 4.6 wt.-%, or about 4.7 wt.-%, or about 4.8 wt.-%, or about 4.9 wt.-%, or about 5.0 wt.-%, or about 5.00 wt.-%. For example, the total content of the fine particulate metal oxide and the aqueous alkaline composition in the mixture of the fine particulate metal oxide, the aqueous alkaline composition and the particulate refractory mould material obtained at the end of step (iv) may be more than 0.5 wt.-%, but less than 5.0 wt.-%, or less than 5.00 wt.-%, or less than 4.9 wt.-%, or less than 4.8 wt.-%, or less than 4.7 wt.-%, or less than 4.6 wt.-%, or less than 4.5 wt.-%, or less than 4.4 wt.-%, or less than 4.3 wt.-%, or less than 4.2 wt.-%, or less than 4.1 wt.-%, or less than 4 wt.-%, or less than 4.0 wt.-%, or less than 3.9 wt.-%, or less than 3.9 wt.-%, or less than 3.5 wt.-%, or less than 3.0 wt.-%, or less than 2.5 wt.-%, or less than 2.0 wt.-%, or less than 1.5 wt.-%, or less than 1.0 wt.-%. For example, the total content of the fine particulate metal oxide and the aqueous alkaline composition in the mixture of the fine particulate metal oxide, the aqueous alkaline composition and the particulate refractory mould material obtained at the end of step (iv) may be less than 5.0 wt.-%, but more than 0.5 wt.-%, or more than 1.0 wt.-%, or more than 1.5 wt.-%, or more than 2.0 wt.-%, or more than 2.5 wt.-%, or more than 3.0 wt.-%, or more than 3.5 wt.-%, or more than 3.8 wt.-%, or more than 3.9 wt.-%, or more than 4 wt.-%, or more than 4.0 wt.-%, or more than 4.1 wt.-%, or more than 4.2 wt.-%, or more than 4.3 wt.-%, or more than 4.4 wt.-%, or more than 4.5 wt.-%, or more than 4.6 wt.-%, or more than 4.7 wt.-%, or more than 4.8 wt.-%, or more than 4.9 wt.-%.

Moisture Level in the Total Mixture

According to one embodiment of the present invention, the total moisture content in the fine particulate metal oxide provided in step (i), the aqueous alkaline composition provided in step (ii) and the particulate refractory mould material provided in step (iii) may be in the range of from 0.8 wt.-% to 1.6 wt.-%, such as from 0.80 wt.-% to 1.60 wt.-%, based on the total weight of the components provided in steps (i), (ii) and (iii). For example, the total moisture content in the fine particulate metal oxide provided in step (i), the aqueous alkaline composition provided in step (ii) and the particulate refractory mould material provided in step (iii) may be about 0.8 wt.-%, or about 0.80 wt.-%, or about 0.9 wt.-%, or about 1 wt.-%, or about 1.0 wt.-%, or about 1.1 wt.-%, or about 1.2 wt.-%, or about 1.3 wt.-%, or about 1.4 wt.-%, or about 1.5 wt.-%, or about 1.6 wt.-%, or about 1.60 wt.-%. For example, the total moisture content in the fine particulate metal oxide provided in step (i), the aqueous alkaline composition provided in step (ii) and the particulate refractory mould material provided in step (iii) may be more than 0.8 wt.-% but less than 1.6 wt.-%, or less than 1.60 wt.-%, or less than 1.6 wt.-%, or less than 1.5 wt.-%, or less than 1.4 wt.-%, or less than 1.3 wt.-%, or less than 1.2 wt.-%, or less than 1.1 wt.-%, or less than 1 wt.-%, or less than 1.0 wt.-%, or less than 0.9 wt.-%. For example, the total moisture content in the fine particulate metal oxide provided in step (i), the aqueous alkaline composition provided in step (ii) and the particulate refractory mould material provided in step (iii) may be less than 1.6 wt.-%, but more than 0.8 wt.-%, or more than 0.80 wt.-%, or more than 0.9 wt.-%, or more than 1.0 wt.-%, or more than 1.1 wt.-%, or more than 1.2 wt.-%, or more than 1.3 wt.-%, or more than 1.4 wt.-%, or more than 1.5 wt.-%. According to one typical embodiment, the particulate refractory mould material provided in step (iii) may have a moisture content of 0.2 wt.-%, contributing to the above values.

In one embodiment, the total moisture content in the fine particulate metal oxide provided in step (i), the aqueous alkaline composition provided in step (ii), the particulate refractory mould material provided in step (iii) and optionally the surfactant and/or metal hydroxide provided in step (iv) may be more than 0.8 wt.-% but less than 1.6 wt.-%, or less than 1.60 wt.-%, or less than 1.6 wt.-%, or less than 1.5 wt.-%, or less than 1.4 wt.-%, or less than 1.3 wt.-%, or less than 1.2 wt.-%, or less than 1.1 wt.-%, or less than 1 wt.-%, or less than 1.0 wt.-%, or less than 0.9 wt.-%, more than 1.65 wt.-% but less than 2.5 wt.-%, or less than 2.50 wt.-%, or less than 2.5 wt.-%, or less than 2.45 wt.-% or less than 2.3 wt.-%, or less than 2.2 wt.-%, or less than 2.1 wt.-%, or less than 2.0 wt.-%, or less than 1.9 wt.-%, or less than 1.8 wt.-%, or less than 1.7 wt.-% based on the total weight of the components provided in steps (i), (ii), (iii) and (iv). According to one typical embodiment, the metal hydroxide provided in step (iv) may have a moisture content of up to 9 wt.-%, contributing to the above values.

Ratio of Binder Components

According to one embodiment of the present invention, the weight ratio of the aqueous alkaline composition provided in step (ii) and the fine particulate metal oxide provided in step (i) may be in the range of 0.05 to 0.5, such as in the range of 0.15 to 0.3, such as in the range of 0.15 to 0.30, or in the range of 0.150 to 0.300, based on the theoretical dry alkaline comprised in the said aqueous alkaline composition. For example, the said ratio may be about 0.05, or about 0.1, or about 0.10, or about 0.15, or about 0.150, or about 0.16, or about 0.17, or about 0.18, or about 0.19, or about 0.20, or about 0.2, or about 0.21, or about 0.22, or about 0.23, or about 0.24, about 0.25, or about 0.26, or about 0.27, or about 0.28, or about 0.29, or about 0.3, or about 0.30, or about 0.300, or about 0.35, or about 0.40, or about 0.45, or about 0.5 or about 0.50. For example, the said ratio may be more than 0.05 but less than 0.5, or less than 0.45, or less than 0.4, or less than 0.40, or less than 0.35, or less than 0.3, or less than 0.30, or less than 0.300, or less than 0.29, or less than 0.28, or less than 0.27, or less than 0.26, or less than 0.25, or less than 0.24, or less than 0.23, or less than 0.22, or less than 0.21, or less than 0.20, or less than 0.2, or less than 0.19, or less than 0.18, or less than 0.17, or less than 0.16, or less than 0.15, or less than 0.10, or less than 0.1. For example, the said ratio may be less than 0.30 but more than 0.05, or more than 0.1, or more than 0.10, or more than 0.15, or more than 0.150, or more than 0.16, or more than 0.17, or more than 0.18, or more than 0.19, or more than 0.20, or more than 0.2, or more than 0.21, or more than 0.22, or more than 0.23, or more than 0.24, or more than 0.25, or more than 0.26, or more than 0.27, or more than 0.28, or more than 0.29.

Fine Particulate Metal Oxide

As discussed above, the said fine particulate metal oxide designates an amorphous metal oxide powders having average primary particle sizes of 50 μm or less. According to one embodiment of the present invention, the fine particulate metal oxide may be selected from the group consisting of silica fume, precipitated silica, pyrogenic silica, silicates, calcined or non calcined aluminosilicates such as metakaolin or perlite, fine alumina, fine titania, fine zinc oxide, diatomaceous earth, and other metal oxides that form metalates in the presence of alkaline, and mixtures thereof. According to a specific embodiment, the fine particulate metal oxide is silica fume. According to a further embodiment, the fine particulate metal oxide is a mixture of silica fume and fumed silica. According to a further embodiment, the fine particulate metal oxide is a mixture of silica fume and fine particulate alumina. According to further embodiments, the fine particulate metal oxide may be furnace dusts comprising a mixture of silica and zirconia, or comprising a mixture of silica, alumina and zirconia.

Aqueous Alkaline Composition

According to the present invention, the aqueous alkaline composition for use as a binder component is not particularly limited. For example, the aqueous alkaline composition may be selected from the group consisting of aqueous sodium hydroxide, aqueous potassium hydroxide, aqueous lithium hydroxide, aqueous calcium hydroxide solution and/or suspension, aqueous magnesium hydroxide suspension, and mixtures thereof. Furthermore, the concentration of the aqueous alkaline composition is not particularly limited. However, the concentration may according to one embodiment, be selected such that the amount moisture in the binder components and/or in the final particulate mixture prepared falls within preferred ranges. For example, the aqueous alkaline composition may be a commercial 33% NaOH (aq.) solution, or a commercial 25% NaOH (aq.) solution, or a commercial 40% NaOH (aq.) solution.

Particulate Refractory Mould Material

According to one aspect of the present invention, the particulate refractory mould material may be selected from foundry sand, silica sand, reclaimed sand, intermediate or high strength ceramic proppants, bauxite, alumina, mullite, olivine sand, chromite sand, zircon sand, chamotte sand, perlite, fly ash, vermiculite and mixtures thereof.

Surfactant

According to one embodiment, a surfactant may be present in the mixture to form a bonded particulate refractory material. A surfactant generally comprises a hydrophilic part and a hydrophobic part, the properties of which are balanced such that in an aqueous phase the surfactants form micelles, for example, or are able to accumulate at the interface.

Any class of surfactants may be used to form a bonded particulate refractory material according to the invention. For example, the surfactant may be anionic, non-ionic, cationic, or amphoteric surfactants. In one aspect, the surfactant may be a non-ionic surfactant, such as for example ethoxylated or propoxylated long-chain alcohols, amines or acids such as fatty alcohol ethoxylates, alkylphenol ethoxylates, fatty amine ethoxylates, fatty acid ethoxylates, fatty acid propoxylates, or sugar surfactants, such as fatty alcohol-based polyglycosides. In one aspect, the fatty alcohols preferably comprise 8 to 20 carbon atoms. In one aspect, the surfactant may be a cationic surfactant, such as for example alkyl ammonium compounds and imidazolinium compounds.

In one aspect, the anionic surfactant may contain a sulphate, sulphonate, phosphate, or carboxylate group as the polar hydrophilic group. If anionic surfactants containing sulphate groups are used, particular preference is given to using sulphuric acid monoesters. If phosphate groups are used as the polar anionic surfactant group, the mono- and di-esters of orthophosphoric acid are particularly preferred.

In one aspect, surfactants used to form a bonded particulate refractory material according to the invention may include a non-polar, hydrophobic portion including, for example alkyl, aryl, and/or aralkyl groups, preferably having more than 6 carbon atoms, or having 8 to 20 carbon atoms. The hydrophobic portion may have both linear chains and branched structures. Mixtures of various surfactants may also be used.

In one aspect, anionic surfactants may be selected from the group consisting of oleyl sulphate, stearyl sulphate, palmityl sulphate, myristyl sulphate, lauryl sulphate, decyl sulphate, octyl sulphate, 2-ethylhexyl sulphate, 2-ethyloctyl sulphate, 2-ethyldecyl sulphate, palmitoleyl sulphate, linolyl sulphate, lauryl sulphonate, 2-ethyldecyl sulphonate, palmityl sulphonate, stearyl sulphonate, 2-ethylstearyl sulphonate, linolyl sulphonate, hexyl phosphate, 2-ethylhexyl phosphate, capryl phosphate, lauryl phosphate, myristyl phosphate, palmityl phosphate, palmitoleyl phosphate, oleyl phosphate, stearyl phosphate, poly-(1,2-ethanediyl-)-phenol hydroxyphosphate, poly-(1,2-ethanediyl-)stearyl phosphate, and poly-(1,2-ethanediyl-)-oleyl phosphate.

When used to form a bonded particulate refractory material according to the invention, the surfactant may be present in an amount of from about 0.001 wt.-% to about 1.0 wt-%, or from about 0.01 wt.-% to about 0.9 wt.-%, or from about 0.05 wt.-% to about 0.8 wt.-%, or from about 0.07 wt.-% to about 0.7 wt.-%, or from about 0.1 wt.-% to about 0.6 wt.-% or from about 0.2 wt.-% to about 0.5 wt.-% based on the total weight of the obtained mixture.

According to one aspect, the surfactant may be added to the binder or to the binder and metal hydroxide before being added to the particulate refractory mould material. For example, the surfactant in solution may be added to the binder. Alternatively, the surfactant may be added as a separate component, such as a solid-phase component. In certain embodiments, the surfactant is preferably dissolved in the binder. In one aspect, the surfactant may be added as an aqueous solution. The concentration of the aqueous surfactant solution is not particularly limited. However, the concentration may according to one embodiment, be selected such that the amount moisture the final particulate mixture prepared falls within preferred ranges. For example, the aqueous surfactant solution may comprise from about 10 wt.-% to about 80 wt.-% of water, or from about 20 wt.-% to about 70 wt.-% of water, or from about 30 wt.-% to about 60 wt.-% of water, or from about 40 wt.-% to about 60 wt.-% of water based on the total weight of the aqueous surfactant solution.

Metal Hydroxide Component

According to one aspect, a metal hydroxide component may be included in the moulding composition. For example, the metal hydroxide component may be selected from the group consisting of aluminum hydroxide, calcium hydroxide, magnesium hydroxide, oxide-hydroxides, such as FeOOH, huntite or hydromagnesite. The metal hydroxide components may have a dehydroxylation or decarbonation temperature in the required temperature range and are often used as fire or flame retardants. In certain examples, the metal hydroxide components have a decomposition/dehydroxylation temperature below about 400° C. (depending on the temperature impact of the core) and above about 200° C., which is generally the temperature used to obtain the required strength. Without wishing to bound by theory, the mechanism for releasing water in a temperature range between 200 and 400° C., for example with aluminum hydroxide, may be explained in two ways: either the released water (34.6% calculated) moves into the core rehydrating and softens the binder bridges, or cracks the binder bridges due to a change in volume.

In one embodiment, starch, carbohydrates, or other materials that predominantly release water or carbon-oxides during thermal load and no benzene, toluene, ethylbenzene, xylene or other hazardous gases or volatiles may also be added to the mixture.

A metal hydroxide component may be useful, for example, in aluminium casting. The melting temperature of aluminium is in the range of 650-750° C., such as 660° C., thus the temperature level in the core is relatively low. The temperature level in the core may depend on the size and shape of the core. The temperature in some parts of the core may be in the range used to induce further hardening by dehydration.

After shooting, additional hardening may occur during casting, thereby increasing the binding and strength of the particulate refractory material. In some examples, the strength of the particulate refractory material may be lowered during storage in humid conditions. In such cases, the dehydration process starts again during casting, resulting in better binding and higher strength. This may, however, cause problems when removing the core or core sand from the casting, especially out of very thin areas like channels in the water jacket of cylinder heads.

Refractory Bonded Particulate Material

In accordance with the present invention, the refractory bonded particulate material obtained from the method according to the invention, has specifically advantageous properties. One particular requirement for using refractory bonded particulate articles such as foundry cores and foundry moulds is that the bending strength should be adequate. This applies both to warm bending strength immediately after forming the material in a core shooter, in order to allow quick handling after shooting, and to cold bending strength after cooling and storage.

For example, if the warm bending strength is too low directly after shooting a core, the core may be damaged or break up upon removal from the core shooter. In that case, additional cooling time may be needed before the core may be removed from the core shooter, or before it may be stored or taken for further use. Therefore it is advantageous that the warm bending strength (for example measured 30 seconds after removal from the core shooter) is no lower than about 120 N/cm$^2$. Furthermore, if the warm bending strength is too high, this may lead to difficulties in handling the newly formed core, as it may become brittle or break up. Therefore it is advantageous that the warm bending strength (for example measured 30 seconds after removal from the core shooter) is no higher than about 200 N/cm$^2$.

For example, the cold bending strength about measured 1 hour after formation should be high enough to allow safe handling and robust use in foundry applications. However, if the cold bending strength is too high, the cores become brittle and risk braking up during use. Therefore it is advantageous to obtain cores having a cold bending strength after 1 hour of storage in air at room temperature within the range of 250 to 500 N/cm$^2$.

Furthermore, the cold bending strength about measured 24 hours after formation is a good indicator to the stability of the obtained cores. Inorganic cores tend to react with air moisture and disintegrate after a certain storage time. Similarly, in case of further curing on air caused by high binder loadings, the cold bending strength may become too high, leading to the problems as discussed above. Without wanting to be bound by theory, it is thought that increased availability of water within the core resulting from higher moisture contents prior to shooting reduces the durability of the core. Therefore it can be shown that the refractory bonded particulate articles formed according to the present invention have better durability than comparative materials. It is therefore advantageous for the cold bending strength measured after storage in an uncontrolled atmosphere at room temperature for 24 hours is within 80 to 120% of the cold bending strength measured after 1 hour.

It should be noted that the present invention may comprise any combination of the features and/or limitations referred to herein, except for combinations of such features which are mutually exclusive. The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

EXAMPLES

Refractory bonded particulate compositions were prepared in accordance with the following protocol.

Approximately 6 kg of mixture were prepared by mixing appropriate amounts of silica sand, silica fume and aqueous sodium hydroxide in a Hobart planetary mixture. First, the silica sand was mixed with the silica fume for about 2 minutes. Next, the aqueous sodium hydroxide solution was added and the composition mixed for another about 2 minutes.

The silica sand was H 32 grade silica sand (Haltern, $d_{50}$=0.32 mm; 99.8% $SiO_2$, 0.10% $Al_2O_3$, 0.03% $Fe_2O_3$; 0.2% moisture). The silica fume employed was a fine microsilica comprising >99 wt.-% $SiO_2$ and having a $d_{10}$ of 0.19 µm, a $d_{50}$ of 0.69 µm, a $d_{90}$ of 10.7 µm, a $d_{99}$ of 18 µm. The NaOH used was a commercially sourced NaOH having a concentration of 33% as supplied by Reininghaus-Chemie GmbH & Co. KG, Essen, Germany. The $Al(OH)_3$ used was a commercially sourced $Al(OH)_3$ as supplied by DADCO.

The mixture was stored in a sealed container in order to avoid hardening by dehydration and partially filled into a sand cylinder of a core shooter LAEMPE L1 (Laempe Mossner Sinto GmbH, Barleben, Germany). The core shooter was set to a shooting pressure of 2 bar into test bars having the dimension 180×22.36×22.36 mm, followed by a baking time of 10 s at 160° C. in the core box and gassing with air at 120° C. for 20 s. Bending strength of the test bars was measured immediately (within 30 sec) after removing the test bars from the core box (t=0h) for warm strength, and after storing at room temperature under air for t=1 h and t=24 h, using a standard 3-point bending strength test in a Zwick/Roell Z005 strength tester.

The required properties of the test bars for the particulate composition to be considered acceptable are that the warm bending strength at t=0 h should be from 120 to 200 N/cm$^2$, the cold bending strength after t=1 h should be from 250 to 500 N/cm$^2$, and the variation of bending strength between t=1 h and t=24 h should be no higher than 20%.

Details of the compositions tested are shown in Table I.

TABLE I

| | NaOH (33%) wt.-% | Silica fume wt.-% | Moisture in particulate mixture wt.-% | Moisture in binder wt.-% | NaOH:s.f. wt.-ratio |
|---|---|---|---|---|---|
| Ex. 1 | 1.5 | 2.5 | 1.20 | 25 | 0.20 |
| Ex. 2 | 1.5 | 3.0 | 1.20 | 22 | 0.17 |
| Ex. 3 | 1.7 | 2.2 | 1.33 | 29 | 0.26 |
| Ex. 4 | 1.8 | 2.5 | 1.40 | 28 | 0.24 |
| Ex. 5 | 1.8 | 3.0 | 1.40 | 25 | 0.20 |
| Ex. 6 | 2.0 | 2.6 | 1.53 | 29 | 0.26 |
| Comp. 1 | 1.3 | 2.0 | 1.07 | 26 | 0.22 |
| Comp. 2 | 1.3 | 3.0 | 1.07 | 20 | 0.14 |
| Comp. 3 | 1.5 | 2.0 | 1.20 | 28 | 0.25 |
| Comp. 4 | 1.5 | 4.0 | 1.20 | 18 | 0.12 |
| Comp. 5 | 2.0 | 1.0 | 1.53 | 44 | 0.67 |
| Comp. 6 | 2.0 | 2.0 | 1.53 | 33 | 0.33 |
| Comp. 7 | 3.0 | 2.0 | 2.20 | 40 | 0.50 |
| Comp. 8 | 3.0 | 4.0 | 2.20 | 29 | 0.25 |

The values shown in bold lie outside the scope of the present invention, or outside the preferred parameters, respectively The bending strength measurements obtained after t=0 h (warm bending), t=1 h and t=24 h are shown in the following Table II.

TABLE II

| | t = 0 h N/cm$^2$ | t = 1 h N/cm$^2$ | t = 24 h N/cm$^2$ | Variation % |
|---|---|---|---|---|
| Ex. 1 | 185 | 275 | 308 | 12.0 |
| Ex. 2 | 143 | 290 | 297 | 2.4 |
| Ex. 3 | 127 | 307 | 289 | 5.9 |
| Ex. 4 | 147 | 374 | 418 | 11.7 |
| Ex. 5 | 167 | 426 | 499 | 17.1 |
| Ex. 6 | 156 | 493 | 396 | 19.7 |
| Comp. 1 | 96 | 169 | 194 | 14.8 |
| Comp. 2 | 42 | 137 | 178 | 29.9 |
| Comp. 3 | 115 | 226 | 219 | 3.1 |
| Comp. 4 | 47 | 181 | 216 | 19.3 |
| Comp. 5 | — | — | — | N/A |
| Comp. 6 | 150 | 377 | 193 | 51.2 |
| Comp. 7 | 83 | 547 | 458 | 16.3 |
| Comp. 8 | 167 | 1043 | 964 | 9.3 |

The values shown in bold lie outside the scope of the present invention, or outside the preferred parameters, respectively It was found that the test bars formed from compositions in accordance with Ex. 1 to 6 of the present invention had good warm bending strength properties at t=0 h and good cold bending strength properties at t=1 h, while at the same time having acceptable to good variation in bending strength between t=1 h and t=24 h. The test bar in accordance with Comp. 5 did not bind and broke up upon removal from the core box. The test bars formed from compositions in accordance with Comp. 1 to 4 and 5 to 8 failed on at least one of the parameters.

Further experiments were carried out based on the composition of Example 4, to which 0.5 wt.-% Al(OH)$_3$ was added along with either 0.1 wt.-% the surfactant (Example 4a) or 0.5 wt.-% surfactant (Example 4b), wherein the surfactant is sodium-2-ethylhexyl-sulfate having a concentration of 47%. The bending strength measurements obtained after t=0 h (warm bending), t=1 h and t=24 h are shown in the following Table III.

TABLE III

| | t = 0 h N/cm$^2$ | t = 1 h N/cm$^2$ | t = 24 h N/cm$^2$ | Variation % |
|---|---|---|---|---|
| Ex. 4a | 130 | 295 | 308 | 4.8 |
| Ex. 4b | 152 | 414 | 396 | 4.5 |

It was found that the test bars formed from compositions in accordance with Ex. 4a and Ex. 4b of the present invention also had good warm bending strength properties at t=0 h and good cold bending strength properties at t=1 h, while at the same time having acceptable to good variation in bending strength between t=1 h and t=24 h.

The invention claimed is:

1. A method of forming a bonded particulate refractory material for use in metal-working, comprising the steps of
    (i) providing a fine particulate metal oxide;
    (ii) providing an aqueous alkaline composition;
    (iii) providing a particulate refractory mould material;
    (iv) optionally providing a surfactant and/or a metal hydroxide;
    (v) mixing the fine particulate metal oxide, the aqueous alkaline composition and the particulate refractory mould material, and optionally said surfactant and/or metal hydroxide to obtain a mixture thereof; and
    (vi) shooting the obtained mixture in a core shooter;
    wherein, in the obtained mixture, a total moisture level of the fine particulate metal oxide and the aqueous alkaline composition is in a range of 10 wt.-% to less than 30 wt.-% based on a total weight, in the obtained mixture, of the fine particulate metal oxide and the aqueous alkaline composition; and wherein substantially all water included in the obtained mixture is derived from the aqueous alkaline composition and/or the surfactant.

2. The method according to claim 1, wherein said shooting includes curing at a temperature of no more than 300° C. for no more than 120 seconds.

3. The method according to claim 1, wherein, in the obtained mixture, a total content of the fine particulate metal oxide and the aqueous alkaline composition is in a range of more than 0.5 wt.-% to less than 5.0 wt.-%, based on a total weight of the obtained mixture.

4. The method according to claim 1, wherein, in the obtained mixture, a total moisture content of the fine particulate metal oxide, the aqueous alkaline composition, and the particulate refractory mould material is in a range of 0.8 wt.-% to 1.6 wt.-%, based on a total weight, in the obtained mixture, of the fine particulate metal oxide, the aqueous alkaline composition, and the particulate refractory mould material.

5. The method according to claim 1, wherein, in the obtained mixture, a total moisture content of the fine particulate metal oxide, the aqueous alkaline composition, the particulate refractory mould material, and the surfactant and/or the metal hydroxide is in a range of 1.6 wt.-% to 2.5 wt.-%, based on a total weight, in the obtained mixture, of the fine particulate metal oxide, the aqueous alkaline composition, the particulate refractory mould material, and the surfactant and/or the metal hydroxide.

6. The method according to claim 1, wherein a weight ratio of the aqueous alkaline composition and the fine particulate metal oxide is in a range of 0.05 to 0.5, based on a theoretical dry alkaline comprised in the aqueous alkaline composition.

7. The method according to claim 1, wherein the shooting includes curing at a temperature of no more than 180° C. for no more than 10 seconds in the core shooter, without using air flow.

8. The method according to claim 1, wherein the shooting includes curing at a temperature of no more than 120° C. for no more than 20 seconds using a pressurised air flow in the core shooter.

9. The method according to claim 1, wherein the fine particulate metal oxide is selected from the group consisting of silica fume, natural silica, precipitated silica, pyrogenic silica, silicates, calcined or non-calcined aluminosilicates, fine alumina, fine titania, fine zinc oxide, diatomaceous earth, and other metal oxides that form metalates in the presence of alkaline, and mixtures thereof.

10. The method according to claim 9, wherein the aqueous alkaline composition is selected from the group consisting of aqueous sodium hydroxide, aqueous potassium hydroxide, aqueous lithium hydroxide, aqueous calcium hydroxide solution and/or suspension, aqueous magnesium hydroxide suspension, and mixtures thereof.

11. The method according to claim 10, wherein the particulate refractory mould material is selected from foundry sand, silica sand, reclaimed sand, intermediate or high strength ceramic proppants, bauxite, alumina, mullite, olivine sand, chromite sand, zircon sand, chamotte sand, perlite, fly ash, vermiculite and mixtures thereof.

12. The method according to claim 11, wherein the total moisture level is in the range of 22 wt.-% to less than 30 wt.-% based on the total weight.

13. The method according to claim 1, wherein the aqueous alkaline composition is selected from the group consisting of aqueous sodium hydroxide, aqueous potassium hydroxide, aqueous lithium hydroxide, aqueous calcium hydroxide solution and/or suspension, aqueous magnesium hydroxide suspension, and mixtures thereof.

14. The method according to claim 1, wherein the particulate refractory mould material is selected from foundry sand, silica sand, reclaimed sand, intermediate or high strength ceramic proppants, bauxite, alumina, mullite, olivine sand, chromite sand, zircon sand, chamotte sand, perlite, fly ash, vermiculite and mixtures thereof.

15. The method according to claim 1, wherein a step of curing by $CO_2$ blowing or microwave irradiation is not required.

* * * * *